Nov. 6, 1962 J. R. WOMERSLEY ETAL 3,062,446

SERIAL ADDER FOR BINARY CODED NUMBERS WITH RADIX CORRECTION

Original Filed May 11, 1951

5 Sheets-Sheet 1

JOHN RONALD WOMERSLEY
RALPH TOWNSEND
INVENTORS
BY [signature]
ATTORNEY

INVENTOR
JOHN RONALD WOMERSLEY
RALP TOHNSEND
BY Frederick E. Haug
ATTORNEY

JOHN RONALD WOMERSLEY
RALPH TOWNSEND
INVENTORS
BY Rudolph E. Hayes
ATTORNEY

Nov. 6, 1962 J. R. WOMERSLEY ET AL 3,062,446

SERIAL ADDER FOR BINARY CODED NUMBERS WITH RADIX CORRECTION

Original Filed May 11, 1951

5 Sheets-Sheet 4

INVENTORS
JOHN RONALD WOMERSLEY
RALPH TOWNSEND
BY Frederick E. Hane
ATTORNEY

Nov. 6, 1962 J. R. WOMERSLEY ETAL 3,062,446

SERIAL ADDER FOR BINARY CODED NUMBERS WITH RADIX CORRECTION

Original Filed May 11, 1951 5 Sheets-Sheet 5

INVENTORS
JOHN RONALD WOMERSLEY
RALPH TOWNSEND
BY Roderick E. Hare
ATTORNEY 3,062,446

SERIAL ADDER FOR BINARY CODED NUMBERS WITH RADIX CORRECTION

John Ronald Womersley and Ralph Townsend, Letchworth, England, assignors to International Computers and Tabulators Limited, a British company Original application May 11, 1951, Ser. No. 225,726, now Patent No. 2,898,042, dated Aug. 4, 1959. Divided and this application Apr. 30, 1959, Ser. No. 816,356
4 Claims. (Cl. 235—170)

This invention relates to electronic circuits for adding two numbers whose values are represented by two trains of pulses.

It is known to represent a number by a train of pulses in such a way that the successive possible pulse positions represent successive binary numbers. The presence of a pulse in a particular position indicates that the corresponding binary number is present, whilst the absence of a pulse indicates zero. Thus a pulse in the first position indicates the value 1, a pulse in the second position indicates value 2, a pulse in the seventh position indicates value 64, and so on. This method of representation in which the denominations of the number occur in succession is usually known as serial operation.

It is possible to modify serial representation in such a way that a plurality of pulses are considered as a group and the pulses of each group are used to represent the value in one denomination of, for example, a decimal number. The pulses of each group retain their binary value within the group, thus representing the values 1, 2, 4 and 8 in the case of a four pulse group. Each pulse group may then represent any number up to 15 using one or more of the four possible pulse positions in combination so that a train of pulses consisting of such groups may be used to represent a multi-denominational number expressed in a system of notation with a radix of 16 or less. If the number of pulses in a group is increased, then systems of notation with larger radices may be used.

It is the object of the present invention to provide electronic circuits adapted to add two numbers represented by serial trains of pulses coded in groups, the successive pulse positions of each group representing the values of successive terms of the binary series.

According to the invention, an electronic adding device adapted for adding together two numbers each represented by a serial train of pulses in coded group form, the successive pulse positions of each group representing the values of successive terms of the binary series, includes a first adding means for adding together the two pulse trains representing the two numbers to form a first sum pulse train, a second adding means for adding together said first sum pulse train, and a pulse train representing in each group a "filler" digit, equal to the difference between the radix of notation of the two said numbers and the sum of all the binary values which may be in a single pulse group increased by one, to form a second sum pulse train, a third adding means for selectively adding to said first sum pulse train, or, alternatively, said second sum pulse train a correction pulse group such that the value of the "filler" digit is added to any pulse group of said first sum or, alternatively, said second sum which produced a carry out of the group during the additions in said first and second adding means, and means for providing a relative time delay equal to the duration of one pulse group between the additions effected in the first and third adding means.

The invention will now be described by way of example with reference to the accompanying drawings, in which.

It will be assumed that the numbers which are to be added are represented by trains of positive going pulses of uniform duration and amplitude. The absence of a pulse indicates zero and the presence of a pulse indicates a value, the actual value being determined by the position of that pulse with respect to the commencement of the pulse train and the system of value coding employed.

Figure 7:
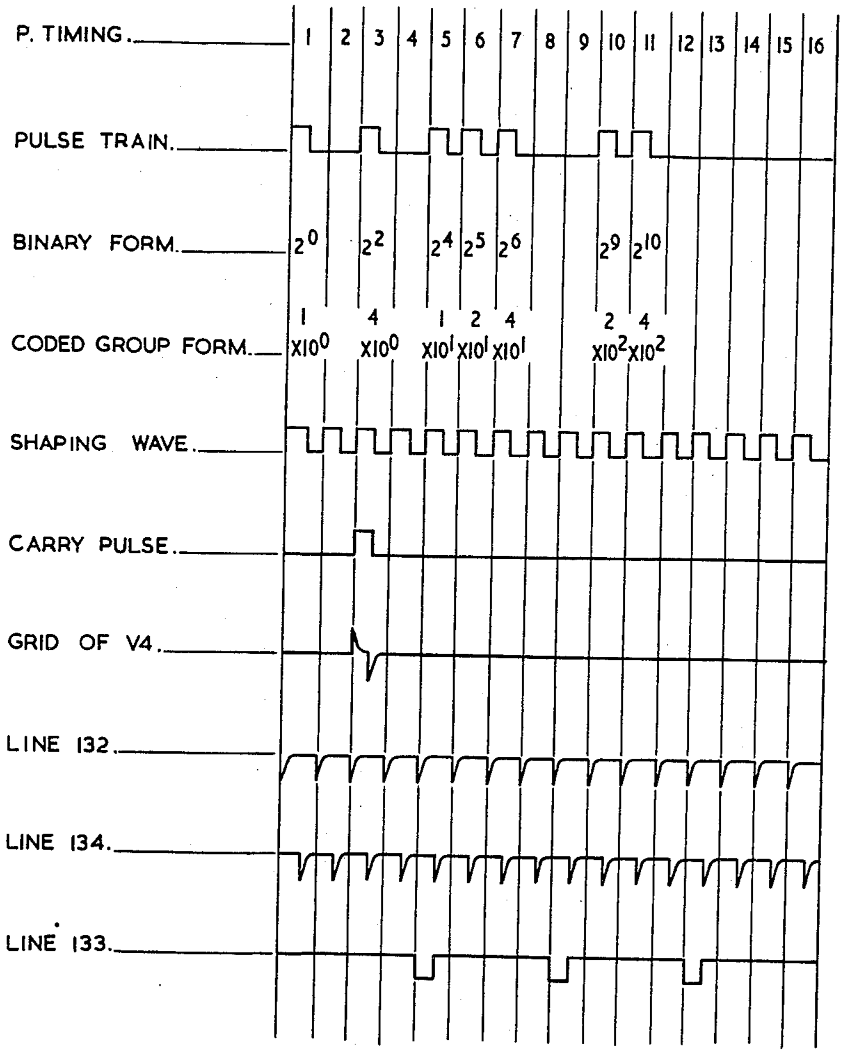
FIGURE 7 is a timing diagram showing the relative timing of certain waveforms.

At the top of FIGURE 7 is shown a representative pulse train having sixteen possible pulse positions of which seven are occupied by pulses. The horizontal axis represents time, with zero reference time, that is, the time of commencement of this particular pulse train, at the left hand side of the diagram.

It is convenient for reference purposes to designate the pulse positions by the letter P followed by a number or numbers indicating the position relative to the commencement of the pulse train; the first pulse position being numbered 1. Thus in FIGURE 7 the representative pulse train has pulses at the $P_1$, $P_3$, $P_5$, $P_6$, $P_7$, $P_{10}$ and $P_{11}$ positions.

The value represented by a pulse in a particular pulse position depends upon the system of notation adopted. If the binary system is used, then the first pulse represents $2^0$, the second pulse $2^1$, the third pulse $2^2$ and so on (FIGURE 7). Thus the representative pulse train would indicate the number 11001110101 in binary.

By regarding the pulse train as divided into groups, with the pulses within each group representing successive terms of the binary series, it is possible to represent numbers in, for example, the decimal system. It is convenient for the decimal notation to divide the pulses into groups of four, the successive groups relating to successive decimal denominations. The pulses within each group represent the values 1, 2, 4 and 8.

The number represented by the pulse train with this coded group system is also shown in FIGURE 7. The $P_1$ and $P_3$ pulses represent 1 and 4 respectively, so that the units digit is 5. The $P_5$, $P_6$ and $P_7$ pulses represent 1, 2 and 4 respectively in the tens denomination and similarly the $P_{10}$ and $P_{11}$ pulses represent 2 and 4 in the hundreds denomination. Accordingly, the number is 675.

Although this four pulse grouping is particularly convenient for the representation of decimal numbers, it is not limited to this notation. The digits 1, 2, 4 and 8 used in combination can express any number up to and including 15. This enables duo-decimal numbers, for example, to be expressed by the same coding. Pulses in the $P_1$, $P_2$ and $P_4$ positions would represent 11 in a duodecimal scale of notation.

When two binary numbers represented by serial pulse trains are added together, any carry occurring as a result of the addition is correctly dealt with by producing a pulse delayed by a time equal to one pulse period and adding this pulse to the sum already formed. Thus two pulses at $P_2$ produce a carry which is delayed and added to any pulses which may be occurring at $P_3$.

When a coded group system of four pulse groups is used with a radix of less than 16, this method of dealing with carries is no longer valid, since it produces an error when the carry takes place from one group to the next higher group, due to the fact that a carry occurs when the representation in a group due to addition exceeds 15. Thus one group of pulses will represent 14 without a carry occurring, whereas the correct representation for the number in radix 10 is 1 in the tens group and 4 in the units group. Similarly, the addition of two pulses at $P_4$, each representing 8, would produce a carry at $P_5$, which with decimal coded group form would represent 10. If the numbers are expressed in decimal, then a further entry of six is required so that the correct representation of 16 may be obtained. This corrective entry or "filler" digit is constant for a particular radix and is equal to the difference between sixteen and the radix of notation.

Considering the addition of two single denomination decimal numbers, each represented by a four pulse group, one of three conditions may arise. Firstly, the sum may be less than ten, in which case a correct representation is obtained. Secondly, the sum may lie between ten and fifteen inclusive, in which case the units digit is incorrect and the required carry is not obtained. Thirdly, the sum may be sixteen or more, in which case the required carry is obtained but the units digit is incorrect.

The correct sum may be obtained in the second and third cases by adding to the sum a "filler" digit of six.

Examples of the three cases are set out below, the number in brackets being the value represented.

I. $$P_2(1)+P_1P_3(5)=P_2P_3(6)$$

The two $P_1$ pulses produce a carry at $P_2$.

II. $$P_4(8)+P_1P_3(5)=P_1P_3P_4(13)$$

No carry has occurred and the representation is 13 in the units denomination, instead of 3 in the units denomination and 1 in the tens denomination. A "filler" of six is added to the sum.

$$P_1P_3P_4(13)+P_2P_3(6)=P_1P_2P_5(13)$$

The value is now correctly represented in the units and tens denominations.

III. $$P_4(8)+P_1P_4(9)=P_1P_5(11)$$

The correct carry to the tens denomination has taken place but the units denomination representation is incorrect. A "filler" of six is added to the sum.

$$P_1P_5(11)+P_2P_3(6)=P_1P_2P_3P_5(17)$$

If this filler correction is effected in each denomination, then the summing of two multi-denominational numbers is correctly effected. By using a different value of "filler" digit the addition of, for example, two numbers in the duo-decimal notation may be effected.

Figure 1:
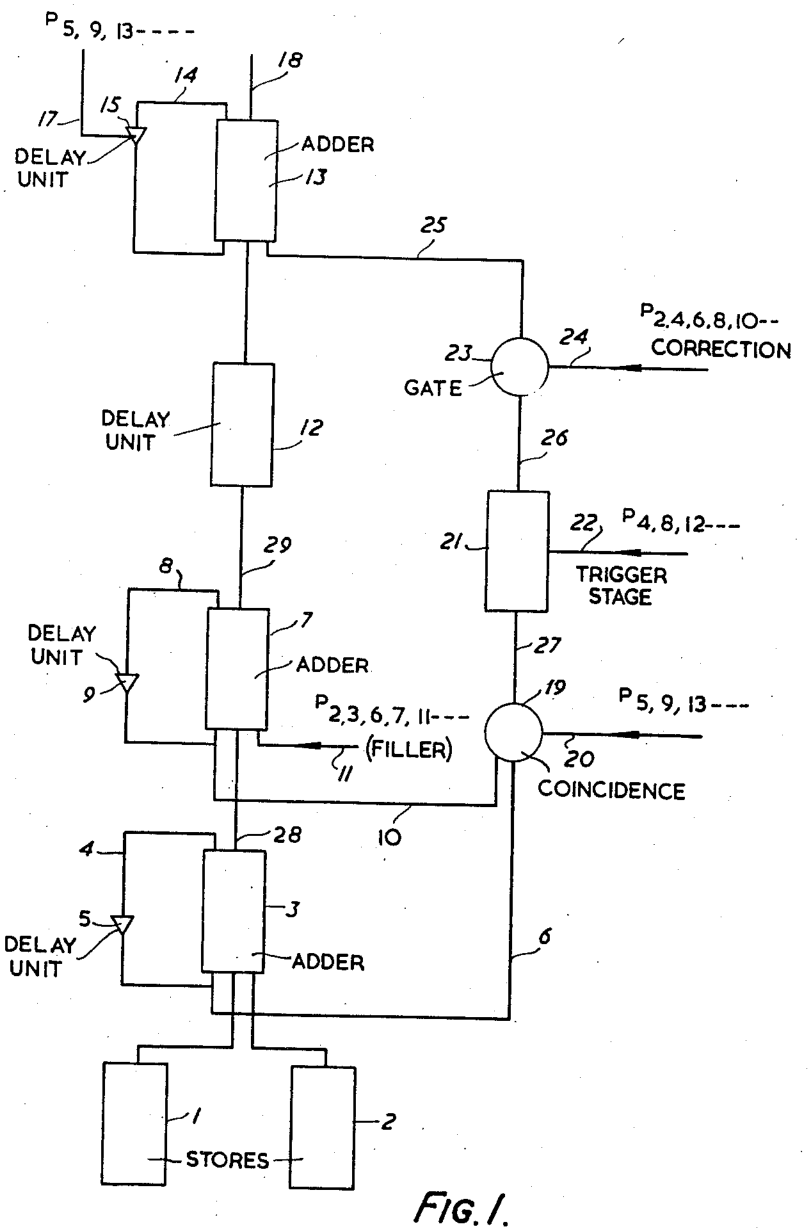
FIGURE 1 is a block schematic diagram of one embodiment of the invention.

A method for effecting this corrective entry of a "filler" digit is illustrated schematically in FIGURE 1, for the case when the numbers are expressed in decimal notation.

The complete adding circuit for dealing with the adding of two decimal numbers and the corrective entry includes a first adding unit which sums the two numbers. The output of this adding unit is fed to a second adding unit which effects addition of the "filler" digit in each denomination. The carry output from the first and second adding units is also fed to a coincidence circuit which determines whether the "filler" digit should have been added in each denomination. If the addition should not have been made the coincidence circuit controls a gating circuit to allow the passage of a pulse group to a third adding unit. This pulse group represents the complement of the "filler" digit to radix 16. The output from the second adding unit is fed to the third adding unit through a delay unit. If the complemental pulse group is added to a particular denomination, that denomination is returned to the same representation as before the addition of the "filler" digit. If the addition of the "filler" digit was correct, the complemental pulse group is suppressed, so that the output from the second adding unit passes unchanged through the third adding unit.

In this way, the output from the third adding box represents correctly the sum of the two input numbers expressed in the original decimal coded group form.

The two numbers to be added are held in two separate storage devices 1 and 2. These storage devices may be of any convenient type which allows of the readout of the stored information in serial form. One example of this type is the ultrasonic delay line. The input pulse train is used to excite a quartz crystal which sets up ultrasonic waves in a column of mercury. These waves are picked up by a second crystal at the other end of the column and thereby reconverted to a train of electrical pulses. The pulses are fed back through a pulse reshaping circuit to the first crystal so that the train of pulses circulates continuously through the system. The pulses may be read out by rendering operative a gating circuit to which is applied the output of the second crystal.

Alternatively, magnetic storage, in which the pulses of a train are recorded in succession around the circumference of a magnetisable drum, may be used. A third form of storage is that in which the pulses are recorded as a charge pattern on the screen of a cathode ray tube and read out by scanning the pattern with an electron beam.

The two pulse trains are read out from the storage in synchronism, that is, corresponding pulse positions of the two trains are read out at the same time. These pulses provide two inputs to an adding unit 3. This adding unit is a form of pulse coincidence circuit, which may accept up to three pulses at the same time, namely, pulses from the two pulse trains and a carry pulse provided by a carry delay unit 5.

If one pulse only is received, one pulse appears on an output line 28. If two pulses are applied to the adding unit, no pulse appears on output line 28, but a pulse is produced on a carry line 4. If three pulses are applied simultaneously, then a single pulse appears on both the output line 28 and the carry line 4.

The pulses on line 4 are fed to carry delay unit 5 which delays them for a time equal to a unit time of one pulse period and then feeds them back to the input of adding unit.

The output line 28 carries a pulse train which represents the sum of the two input pulse trains, but which may not represent the correct numerical sum, if carries have, or should have, occurred between pulse groups. This pulse train is fed to a second adding unit 7. A train of pulses representing six in each denomination, that is, pulses at $P_{2,3,6,7}$ . . . is also fed to this adding unit via a line 11.

Accordingly, on output line 29 of the second adding unit 7 will appear a train of pulses representing the sum of the two input trains with six added in each denomination. The unit 7 has a similar carry circuit to the first adding unit 3, the carry pulse appearing on line 8 and being fed back to the input of the unit via a carry delay circuit 9.

The combined sum is passed to a delay unit 12 producing a delay of four units and from there to a third adding unit 13. If the sum of the two digits of the original number in any denomination is ten, or greater, then the "filler" digit of six is required. Thus the pulse group relating to this denomination is correct before it reaches the third adding unit 13. If, however, this sum was less than ten, the pulse group is incorrect, the "filler" digit having been added to every group in adding unit 7. In this latter case, it is necessary that the "filler" digit be subtracted to obtain the correct representation.

From the examples already given, it will be noted that when the "filler" digit is required, a carry out of the pulse group is produced either when the two numbers are added or when the "filler" digit is added to the sum of the two numbers. Hence, the occurrence of this carry may be used to determine whether the "filler" digit, added in unit 7, should remain in any particular denominational pulse group in the final output pulse train.

The carry pulses fed back to the inputs of adding units 3 and 7 are also fed by lines 6 and 10 respectively to a coincidence circuit 19. A series of pulses at $P_{5,9,13}$ . . . are also fed to the coincidence circuit by line 20. If pulses occur simultaneously on line 20, and one of the lines 6 or 10, then the circuit 19 is rendered operative, producing an output pulse on line 27. The timing of the pulses on line 20 at $P_{5,9,13}$ . . . ensures that only a carry occurring from one pulse group to the next is capable of operating circuit 19.

The output pulse on line 27 is fed to unit 21 which is a trigger stage controlling the priming for operation of a gate circuit 23. If a pulse is received from circuit 19, the trigger stage 21 is switched off, rendering gate 23 inoperative. The trigger stage 21 is reset on once for each group of pulses by a train of resetting pulses at $P_{4,8,12}$ . . . applied via line 22.

If there is no pulse from circuit 19 at the end of a group of four pulses, trigger stage 21 will remain on, priming gate 23 for operation. A train of pulses at $P_{2,4,6,8,10}$ . . . is also applied to gate 23 via line 24. With the gate primed, output pulses at $P_{2,4,6,8,10}$ . . . will be produced by the gate on output line 25 and fed to the third adding unit 13. These pulses represent ten in each denomination, that is the complement of the "filler" digit of six to radix 16, and these will be added, to the sum of the two numbers and the "filler" digit, in any denomination for which no carry occurred out of that denomination. For those denominations in which a carry out of the denomination occurred, at either the first or second adding unit, the addition in the third adding unit of the pulses representing ten will be suppressed by the action of units 19, 21 and 23.

Since the full capacity of the four pulse group is fifteen, the addition of six in adding unit 7 and of ten in adding unit 13 will cause a carry and a representation which is the same as that before the addition of six and ten took place in that particular group. For example, if the original numbers added were one and three, then the stages may be set out as below:

$$P_1+P_1P_2=P_3$$

Add six in adding unit 7

$$P_3+P_2P_3=P_2P_4$$

Add ten in adding unit 13, since no carry has occurred $$P_2P_4+P_2P_4=P_3P_5$$

The carry is due to the addition of a total of sixteen in the filling and correction process to the sum of the original numbers and must therefore be suppressed. The carry line 14 from adding unit 13 is connected to a unit delay circuit 15 in the same way as for the other adding units and provision is made for suppressing the output of this delay unit, by applying pulses at $P_{5,9,13}$ . . . to it via line 17, that is, at each time a carry between groups might occur. The output from adding unit 13 on line 18 will be a pulse train representing the true decimal sum of the two original decimal numbers.

Since the whole addition operation is carried out in serial form, each denomination will be corrected in turn and the number of denominations is limited only by the number of pulse groups provided.

Instead of adding the "filler" digit in every denomination and then adding the complement in those denominations in which the "filler" digit is not required, the addition of the "filler" digit may be suppressed initially in those denominations. A test is made for each denomination to determine whether an addition of the "filler" digit is required and the result of the test governs the suppression or feeding of the pulse group representing the "filler" digit to an adding unit which also receives the sum of the two numbers.

The circuit for effecting this modified form of correction is generally similar to that already described. The two numbers are added in a first adding unit and the sum is passed to a delay unit, the output of which is fed to a third adding unit. The output from the first adding unit is also fed to a second adding unit which also receives the "filler" digit pulse groups. This second adding unit determines whether a carry out of the group occurs as a result of the addition of the "filler" digit and is accordingly referred to as the carry generator. The carry output from the carry generator is fed to a coincidence circuit, together with the carry output from the first adding unit and a pulse train timed to select those carries occurring at a time when carry between pulse groups occurs. If this coincidence circuit is operated due to a carry from the first adding unit or the carry generator, then it controls a gating circuit to allow a pulse group representing the "filler" digit to be fed to the third adding unit where it is combined with the sum of the two numbers, so that the output from this unit represents the corrected sum.

Figure 2:
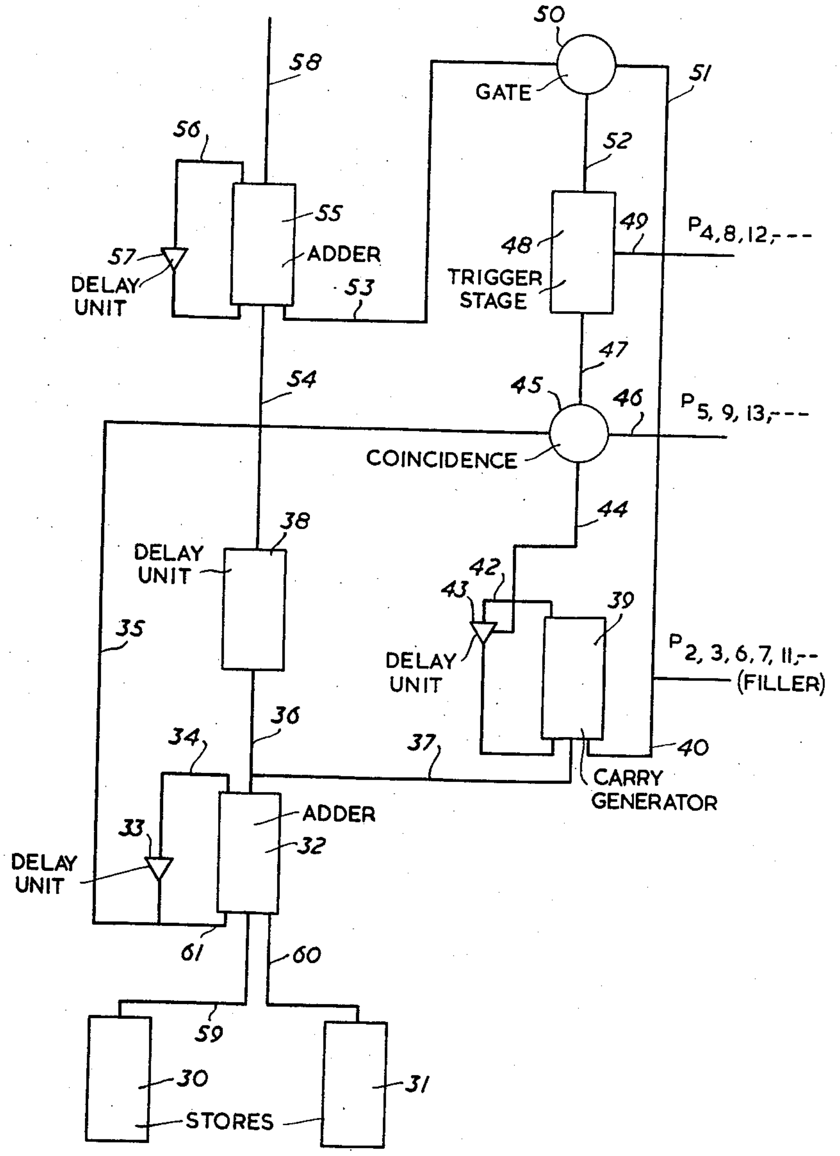
FIGURE 2 is a block schematic diagram of a second embodiment of the invention.

The two pulse trains representing the two numbers are fed from two storage devices 30 and 31 by lines 59 and 60 to a first adding unit 32 (FIGURE 2). This unit is of the same type as adding units 3 and 7 (FIGURE 1) (already referred to). The output pulse train representing the uncorrected sum of the two numbers is fed by line 36 to a delay unit 38 providing a delay equal to four pulses. The carry output on line 34 is fed through a carry delay unit 33 back to the input of adding unit 32. The output from the delay unit 38 is fed by line 54 to a third adding unit 55.

The output from the first adding unit 32 is also fed by line 37 to a carry generator 39, which consists of a simplified version of an adding unit, such as unit 32. A second input to carry generator 39 is provided by line 40 which carries pulse groups representing the "filler" digit. The carry output from generator 39 appears on line 42 which feeds it to a carry delay unit 43, from which it is fed back to the input of the carry generator.

An output line 44 is connected to the carry delay unit 43 immediately prior to the point at which carry suppression occurs and feeds the carry pulses produced by carry generator 39 to a coincidence circuit 45. A line 35 connects the coincidence circuit to the carry input of the first adding unit 32. A train of pulses timed at $P_{5,9,13}$ . . . is applied to the coincidence circuit 45 by line 46 and if any of these pulses occur at the same time as a carry pulse on either of the lines 44 or 35, an output pulse appears on line 47.

Ths output pulse is fed by line 47 to a trigger stage 48 which controls the priming of a gate circuit 50 via line 52. The trigger stage is normally off, rendering gate circuit 50 inoperative. If a pulse is received via line 47, the trigger stage is switched on, gate circuit 50 is made operative, and a train of pulses timed at $P_{2,3,6,7,11}$ . . . is allowed to pass to an output line 53 and thence to an input of adding unit 55. This train of pulses represents the "filler" digits, so that when an output is produced by the coincidence circuit 45, "filler" digits are fed to the adding unit 55 to be added to the sum of the two numbers which appears on line 54. Adding unit 55 is provided with a carry output line 56 and carry delay unit 57 similar to that of adding unit 32. Accordingly, on output 58 from adding unit 55 appears the corrected sum of the two numbers.

Trigger stage 48 is reset off once for each group of pulses by a train of resetting pulses applied to it via line 49. Thus each pulse on line 47 causes the addition of one "filler" digit pulse group before the trigger stage is reset.

Since the pulses are coded in groups of four, it is not possible, in general, to determine whether correction is necessary in a particular group until the whole of the group has passed through adding units 3 and 7 (FIGURE 1) or adding unit 32 and carry generator 39 (FIGURE 2). Thus the adding of the "filler" digit group cannot commence until at least four pulse times after the first pulse of the particular group is read out from storage.

This delay is provided by the delay units 12 and 38. Although these units have been described as providing four units of delay, it may be convenient to increase the delay. When using ultrasonic delay lines for storage, it is usual to delay a number by a complete cycle rather than by parts of a cycle, where a cycle consists of the maximum number of pulses employed in representing one number. Thus, if a cycle consists of 32 pulses, the delay unit 38, for example, might provide 32 units of delay and a delay unit giving 28 units of delay inserted in line 47 feeding the output of the coincidence circuit 45 to trigger stage 48. This arrangement maintains the required relative delay of four units between the main adding channel and the "filler" digit control channel and at the same time brings the output pulses on line 58 into phase with the input pulses from storage units 30 and 31, but delayed by one complete cycle.

The same result may also be achieved by inserting a delay unit giving 28 units of delay in the output line 58, thus providing with delay unit 38 having a four unit delay an overall delay of one complete cycle of 32 pulses.

It is assumed that at the pulse repetition frequency at which the circuit is operated, the delay introduced by the adding units such as 32 is negligible. For example, if the delay of an adding unit is .1 microsecond, then at a pulse frequency of 50 kc./s., the pulse duration is 20 microseconds and the delay introduced $$\frac{1}{200}$$

of the pulse interval which is sufficiently small to be unimportant.

Several of the circuit units employed in the two embodiments of the invention described are identical or very similar. Circuits which perform the required functions will now be described in detail.

*Adding Unit*

This circuit may be employed to perform the functions of units 3, 7 and 13 (FIGURE 1) and units 32 and 55 (FIGURE 2).

The purpose of the circuit (FIGURE 3) is to determine the number of pulses which occur simultaneously on three input lines and provide a pulse output which represents the sum of the input pulses. Two of the inputs relate to pulse trains representing numbers to be added and the third to carry pulses.

There are four possible conditions in terms of the number of simultaneous input pulses:

(1) No input pulse:no output pulse
(2) One input pulse:one output pulse
(3) Two input pulses:one carry pulse
(4) Three input pulses:one output pulse and one carry pulse.

In order to perform this function there are provided a group of six rectifiers, so connected to the three input lines that an output is obtained only if two or more pulses are present simultaneously, a group of three rectifiers so connected that an output is obtained only with three pulses present simultaneously, and a second group of three rectifiers which provide an output when only one pulse is present, together with means for suppressing the output of this group if an output is also obtained from the group of six rectifiers. Thermionic valves are controlled by the outputs from these rectifier groups to provide suitable pulse outputs for operating other units.

Any asymmetrically conducting resistance, such as a germanium crystal rectifier, may be used for the above-mentioned groups of rectifiers, provided that the ratio of back to forward resistance is sufficiently great to provide the discrimination required to ensure satisfactory operation of the controlled valves.

The circuit will be described as being in the position of adding unit 32 (FIGURE 2) and the input and output lines will be referenced accordingly.

The group of six rectifiers is divided into three pairs 62, 63 and 64, 65 and 66, 67, with the anodes of each pair being connected together and the cathodes of each pair being connected to two of the three input lines 59, 60 and 61. Each rectifier of a pair is connected to a different input line, so that each input line has two rectifiers out of the six connected to it. The commoned anodes of each of the three pairs are connected through resistors 74, 75 and 76 respectively to a line 104 which is held at a potential positive with respect to ground.

It is assumed that the characteristics of the input devices are such that the input lines 59, 60 and 61 are held at ground potential in the absence of a pulse and are raised to a positive potential when a pulse occurs. Accordingly, with no input pulses the cathodes of the rectifiers 62 to 67 are at ground potential and current will therefore flow from the positive line 104 through the resistors 74, 75 and 76, through the six rectifiers to the lines 59, 60, 61. The anodes of the rectifiers will therefore be at a lower potential than line 104, due to the potential drop across the resistors 74, 75 and 76.

If now a positive pulse appears on line 59, for example, the cathodes of rectifiers 64 and 67 will be driven positive. If the pulse is of sufficient amplitude, these cathodes will become more positive than the anodes, the maximum potential of which is limited to that of line 104, and accordingly these two rectifiers will cease to conduct. This tends to make the anodes rise to the potential of line 104. However, the cathodes of rectifiers 65 and 66 are still held at ground potential by lines 60 and 61 respectively, and since the anodes of these rectifiers are common with the anodes of rectifiers 64 and 67, the anodes are still held at or near the normal potential.

If a positive pulse appears on lines 59 and 60, the cathodes of both rectifiers 66 and 67 rise in potential and the rectifiers cease to conduct. Since both rectifiers are non-conducting, there is no potential drop across resistor 76 and the anodes rise to the potential of lines 104. This rise in potential is communicated through a rectifier 81, joined to the anodes, to a line 113. Rectifiers 64 and 63 will also be non-conducting, but the other rectifier of each pair will remain conducting, since it is joined to line 61, which is at ground potential, so that these two pairs will have no effect on the potential of line 113, to which their anodes are connected through rectifiers 80 and 79, respectively. The three rectifiers 79, 80 and 81 serve to prevent circuit commoning between the pairs of rectifiers 62 to 67.

If any other pair of the lines 59, 60 and 61 goes positive then the commoned anodes of one of the other pairs of rectifiers will rise in potential and this will be communicated to the line 113 through rectifiers 79 or 80. If all three lines 59, 60 and 61 go positive, then all three pairs of rectifiers will become non-conducting and the potential of line 113 will again rise. Thus the occurrence of two or more pulses will produce a corresponding rise of potential on line 113.

The first group of three rectifiers comprises rectifiers 71, 72 and 73, the anodes of which are commoned and the cathodes of which are connected one each to one of the three input lines. The commoned anodes are connected through a resistor 78 to line 104. By using the same argument as applied in the case of two rectifiers, it may readily be shown that the commoned anodes of rectifiers 71, 72 and 73 will rise in potential only when all three input lines 59, 60 and 61 are pulsed simultaneously.

The second group of three rectifiers comprises rectifiers 68, 69 and 70, the cathodes of which are commoned and the anodes of which are connected one each to one of the three input lines. The commoned cathodes are connected through a resistor 77 to a line 107, which is at a potential negative to ground. When the input lines are at ground potential, all three rectifiers are conducting. If, for example, a positive pulse appears on line 59, the anode of rectifier 70 rises in potential, which causes the commoned cathodes to rise also. The rise is sufficient to bring the cathodes above ground potential, so that rectifiers 68 and 69 become non-conducting. Similarly, the commoned cathodes will rise in potential if a pulse appears on either of the other input lines.

The effect of these groups of rectifiers is that line 113 goes positive with two or more input pulses, the commoned anodes of rectifiers 71, 72 and 73 go positive with three input pulses and the common cathodes of rectifiers 68, 69 and 70 go positive with one or more input pulses.

In order to provide a unique indication of the number of pulses, it is necessary that the effect of rectifiers 68, 69 and 70 be annulled if two or more pulses are present, that is if line 113 goes positive. Line 113 is connected through a resistor 92 to the grid of a triode valve V3. The anode of this valve is connected to a positive H.T. supply line 105, through a resistor 103 and the cathode is connected to a smaller positive potential by a line 106, such that the valve is normally held non-conducting. When line 113 goes positive, the grid of V3 is raised in potential, the rise being limited by grid current flowing in resistor 92. Valve V3 conducts so that the anode potential falls and a negative pulse is transmitted through a condenser 97 connected to the anode. The other side of this condenser is connected to the anodes of two rectifiers 82 and 89. This junction is also connected through a resistor 83 to line 104. The cathode of rectifier 82 is connected to the commoned cathodes of rectifiers 68, 69 and 70. The cathode of rectifier 89 is connected through a resistor 88 to a ground potential line 108. The rectifiers 82 and 89 are normally conducting, owing to the connection of their anodes to the positive line 104.

Since rectifiers 82 and 89 are normally conducting a positive potential rise at the common cathodes of rectifiers 68, 69 and 70 is transmitted through the rectifiers 82 and 89 in series to a condenser 93, which is connected to the cathode of rectifier 89 and via the condenser to the junction of two rectifiers 98 and 99. If, at the same time, line 113 goes positive, then the junction of rectifiers 82 and 89 is driven negative by a pulse from the anode of V3, as already described. This has the effect of rendering rectifiers 82 and 89 non-conducting, so that the rise at the cathodes of rectifiers 68, 69 and 70 is not transmitted to condenser 93.

The junction of rectifiers 98 and 99 is connected through resistors 112 and 102 in series to the grid of a triode V2. The junction of resistors 112 and 102 is connected through a resistor 100 to a negative bias line 109, and through a condenser 101 to a line 111 which carries a shaping waveform. This shaping waveform comprises a continuous train of pulses (FIGURE 7).

The anode of rectifier 98 is connected to the negative line 107 and the cathode of rectifier 99 is connected to a line 110, the potential of which is slightly negative with respect to ground. Since the potential of the bias line 109 is more negative than that of line 107, rectifier 98 is normally conducting, thus stabilising the grid of V2 at a negative potential. The cathode of V2 is connected to ground line 108 through a resistor 96 and the anode is directly connected to the positive H.T. supply line 105.

The stabilised grid potential of V2 is such that the valve is held well below cut-off. The amplitude of the positive pulses of the shaping waveform applied to the grid via condenser 101 and resistor 102 is sufficient to bring the grid to just below cut-off. If a positive pulse is fed simultaneously to the junction of rectifiers 98 and 99, the combined effect of the two pulses is sufficient to bring the grid of V2 above cut-off, so that the valve conducts and a positive pulse is developed across the cathode load resistor 96 and appears on the output line 36. The amplitude of the pulse at the junction of 98 and 99 is limited to approximately the difference of potential between lines 107 and 110 by conduction occurring through rectifier 99.

The anode and cathode of a further triode V1 are connected in parallel with the anode and cathode of V2. The grid of V1 is provided with an input circuit similar to that of V2, comprising condenser 90, rectifiers 84 and 85, resistors 86, 87 and 94, and condenser 95 connected to the shaping waveform line 111. The other side of condenser 90 is connected to the commoned anodes of rectifiers 71, 72 and 73. By analogy with the case of V2, it will be seen that when the anodes of rectifiers 71, 72 and 73 go positive, then a positive pulse will appear on output line 36.

Thus a positive pulse is obtained on line 36 whenever one pulse occurs due to the action of V2 and when three pulses occur simultaneously by the action of V1. The output is suppressed for two simultaneous pulses by the action of V3 as already explained.

A negative pulse appears at the anode of V3 for either two or three simultaneous pulses and this pulse is fed to a carry delay unit by line 34.

*Carry Delay Unit*

Figure 3:
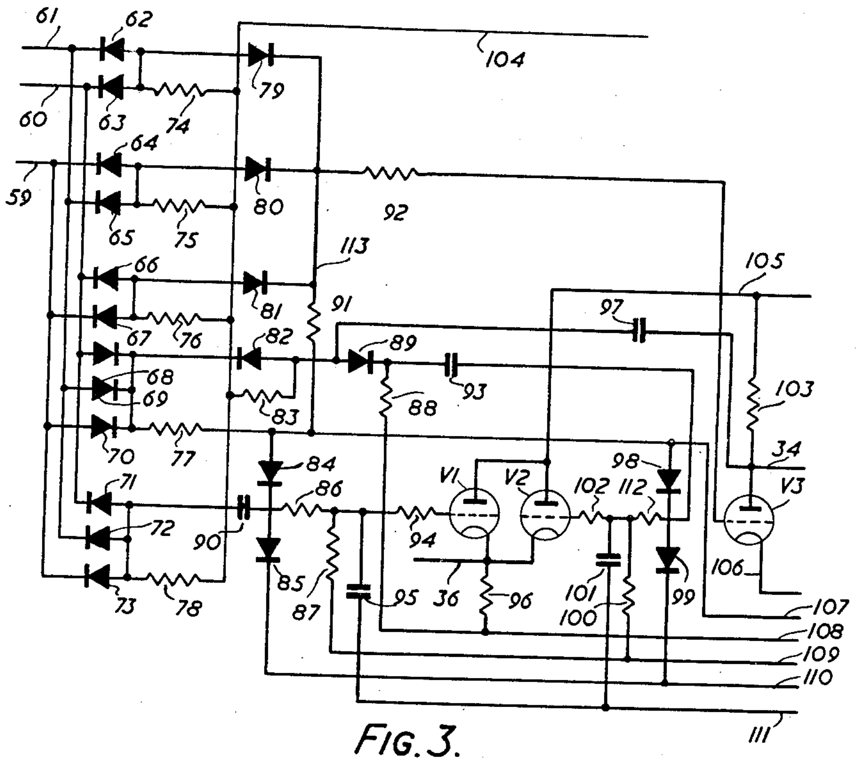
FIGURE 3 is a circuit diagram of an electronic adding unit.
Figure 4:
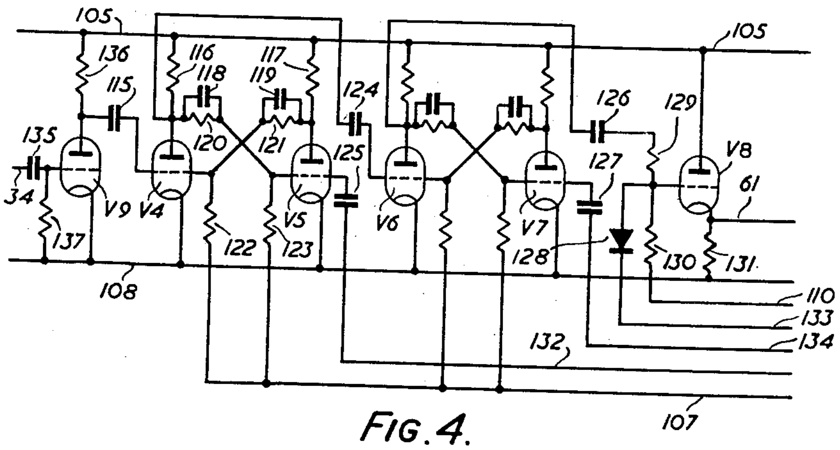
FIGURE 4 is a circuit diagram of a carry delay unit for use with adding unit.

The carry delay unit is also similar for each of the various adding units but will be described with reference to adding unit 32 (FIGURE 2). The negative carry pulse at the anode of V3 of the adding unit (FIGURE 3) is fed by line 34 and a condenser 135 to the grid of a triode V9, in the carry delay unit (FIGURE 4). The grid of V9 is connected through a resistor 137 to ground line 108 and the cathode is directly connected to line 108. The anode of V9 is connected to the positive H.T. line by a resistor 136. Thus V9 is normally conducting and the negative carry pulse applied to the grid cuts it off, producing a positive pulse at the anode which is fed via a condenser 115 to the grid of a triode V4.

Triode V4 and a similar triode V5 form a trigger stage of known form, with two stable states. The anodes of V4 and V5 are connected through resistors 116 and 117 respectively to the H.T. supply line 105 and the grids are connected through resistors 122 and 123 respectively to the negative potential line 107. The anode of V4 is connected to the grid of V5 by a resistor 120 in parallel with a condenser 118. The anode of V5 is connected to the grid of V4 by a resistor 121 in parallel with a condenser 119. The combination of V4 and V5 may assume either one of two stable states, with either valve conducting and the other non-conducting. The stage may be switched from one stable state to the other by the application of suitable negative pulses to the grid of V4 or V5 or to both grids.

Condenser 115 and resistor 122 form a network, the time constant of which is short compared with the duration of a carry pulse. Accordingly, the carry pulse is differentiated to produce sharp pulses coinciding with the leading and trailing edges (FIGURE 7). The negative going pulse produced by the differentiation of the trailing edge causes V4, which is normally conducting, to become non-conducting, so that the trigger stage switches over to the other stable state.

The grid of V5 is connected by a condenser 125 to a line 132 which carries a waveform comprising one short negative pulse at the beginning of each pulse period (FIGURE 7). This waveform may be produced, for example, by reversing the polarity of the shaping waveform (FIGURE 7) differentiating it and suppressing the positive pulses resulting from the differentiation. Thus, at the beginning of the next pulse period, a negative pulse on line 132 causes V5 to become non-conducting and the trigger stage switches back to the original state.

When the switching takes place, V4 becomes conducting once more and the anode falls in potential. This drop is applied via a condenser 124 to the grid of a triode V6. Triode V6 and a further triode V7 form a second trigger stage similar to the trigger stage V4, V5.

Triode V6 is conducting at this time, so that the negative pulse from the anode of V4, differentiated by condenser 124, cuts V6 off and reverses the state of the trigger stage V6, V7. The grid of V7 is connected by a condenser 127 to a line 134 which carries a waveform comprising one short negative pulse occurring in the middle of each pulse period (FIGURE 7). This waveform may be produced by differentiating the shaping waveform and suppressing the positive pulses resulting from the differentiation. The next pulse on line 134 after the switching of the trigger stage takes place will cut V7 off, so that the stage then switches back to its normal state. In this way, triode V6 is made non-conducting at the beginning of the next pulse period after a carry pulse occurs, and remains so for half a pulse period until the trigger stage V6, V7 is switched by a pulse on line 134. The output from the anode of V6 is a positive pulse of the correct duration and delayed by one pulse period on the carry pulse which initiated it.

The anode of V6 is connected via a condenser 126 and a resistor 129 in series to the grid of a cathode follower V8. The grid is also connected by a resistor 130 to the negative potential line 110. The cathode of V8 is connected by a resistor 131 to ground line 108. The bias provided by line 110 is sufficient to keep V8 normally non-conducting, but when a positive pulse is applied to the grid from the anode of V6, the valve conducts, producing a positive pulse across the cathode resistor 131. This output is fed to an input of the adding unit by a line 61 connected to the cathode of V8 (FIGURES 3 and 4).

The timing of the pulses on lines 132 and 134 (FIGURE 7) relative to the carry pulses is such that the trigger stages V4, V5 and V6, V7 are reset at such times that they are always in the correct state to be set whenever a carry pulse does occur.

In certain of the carry delay units, such as 15 (FIGURE 1), it is necessary to suppress any carry which might occur between groups of pulses. The means for doing this is shown in FIGURE 4. A rectifier 128 is connected to the grid of V8 and to a line 133 which carries a train of pulses timed at $P_{5, 9, 13} \ldots$ (FIGURE 7). These negative pulses are of sufficient amplitude to prevent the grid of V8 rising above cut-off even if a positive pulse from the anode of V6 occurs at the same time. Since V8 does not conduct, there is no output to line 61. When this carry suppression is not required, as, for example, in carry delay unit 33, line 133 may be disconnected from the pulse source and connected to line 110.

*Coincidence and Gating Circuits*

Figure 6:
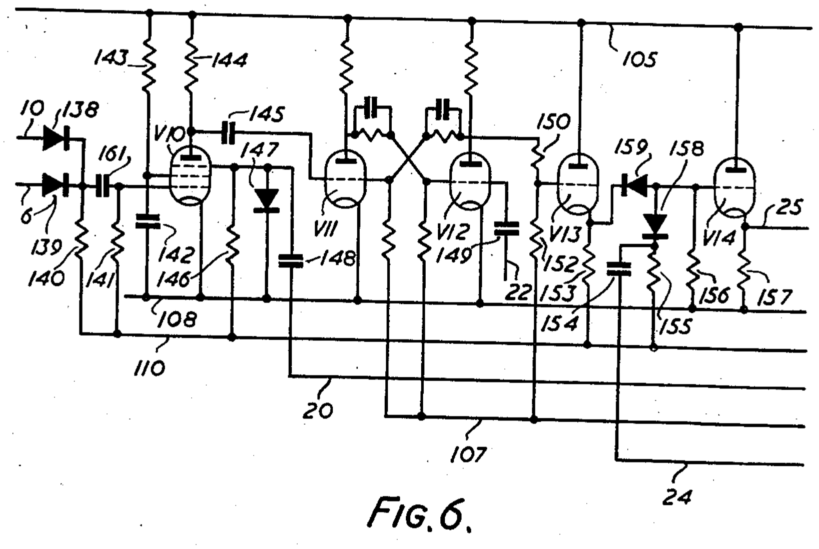
FIGURE 6 is a circuit diagram of a gating circuit.

These circuits include the coincidence circuit 19 (FIGURE 1), the trigger stage 21 and the gate circuit 23. The detailed circuits are shown in FIGURE 6.

The carry input pulses to adding units 3 and 7 are fed to a coincidence valve V10 by lines 6 and 10. The lines 6 and 10 are connected to the anodes of two rectifiers 138 and 139 (FIGURE 6), the cathodes of which are commoned and connected by a condenser 161 to the control grid of a pentode V10. Both sides of the condenser are connected through resistors 140 and 141 to negative voltage line 110. The anode of V10 is connected to the H.T. positive line 105 through a resistor 144 and the cathode is directly connected to ground line 108. The screen grid is connected to line 105 by a resistor 143 and by-passed to line 108 by a condenser 142, the suppressor grid by a resistor 146 to line 110, by a rectifier 147 to line 108 and by a condenser 148 to line 20. Line 20 carries a train of positive pulses timed at $P_{5, 9, 13} \ldots$ and rectifier 147 prevents these pulses driving the suppressor above ground potential. The potential of line 110 is such that both the control grid and the suppressor grid are normally held below cut-off.

If, and only if, a pulse occurs simultaneously on either of lines 6 or 10 and on line 20, both grids of V10 will be brought above cut off, the valve will conduct and a negative pulse will be produced at the anode. The rectifiers 138 and 139 serve to prevent coupling between the lines 6 and 10.

The negative pulse at the anode of V10 is fed by a condenser 145 to the grid of a triode V11. This triode forms, with a similar triode V12, a trigger stage similar to those already described. V11 will be conducting at this time, so that the negative pulse cuts it off and the trigger stage switches over to the other state with V11 non-conducting and V12 conducting. The grid of V12 is connected by a condenser 149 to a line 22 (FIGURES 1 and 6), carrying a train of positive pulses timed at $P_{4, 8, 12} \ldots$ and condenser 149 and the grid resistor of V12 differentiate these pulses to produce a negative pulse coinciding with the trailing edge to reset the trigger stage with V12 non-conducting.

The anode of V12 is connected through resistors 150 and 152 in series to negative voltage line 107. The junction of resistors 150 and 152 is connected to the grid of a triode cathode follower V13. This valve has the anode connected to line 105 and the cathode connected to line 110 through a resistor 153. When V12 is non-conducting the grid potential of V13 allows the valve to conduct so that the cathode is positive to ground, but when V12 conducts, the drop in potential is sufficient to cut V13 off and the cathode of V13 falls to the potential of line 110.

The cathode of V13 is connected to the cathode of a rectifier 159, the anode of which is connected to the grid of a second triode cathode follower V14. The grid of V14 is also connected to line 108 through a resistor 156 and to line 110 through a rectifier 158 and resistor 155 in series. To the junction of the cathode of rectifier 158 and resistor 155 is connected a condenser 154, the other side of which is connected to line 24 (FIGURES 1 and 6) which carries a train of positive pulses timed at $P_{2, 4, 6, 8} \ldots$. The anode of V14 is connected to line 105 and the cathode is connected to an output line 25 and through a resistor 157 to line 108.

When the cathode of V13 is positive, rectifier 159 will be non-conducting and the potential of the grid of V14 will be determined by the resistors 155, 156 and the potential of line 110. In this condition, V14 is non-conducting, but when positive pulses are fed to the grid from line 24, the valve conducts, producing a positive pulse output on line 25. If V13 is non-conducting, rectifier 159 will conduct and hold the grid of V14 to the potential of line 110. The positive pulses on line 24 are now unable to bring the grid above cut-off and accordingly no output is obtained. Thus when no carry pulse is fed to the circuit, the pulses on line 24 are allowed to pass to the output line 25 and thence to adding unit 13 (FIGURE 1). If a carry pulse occurs, the trigger stage is set and it is not reset by pulses on line 22 until one group of pulses on line 25 has been suppressed.

The coincidence and gating circuit, comprising units 45, 48 and 50 (FIGURE 2) is very similar to that already described. However, it has to suppress the output except when a carry pulse occurs. To effect this, the end of resistor 150 remote from the grid of V13 is connected to the anode of V11 instead of the anode of V12. Thus V13 is made conducting only when a carry pulse has occurred and the output is suppressed except at such a time.

*Carry Generator*

The carry generator unit 39 (FIGURE 2) has only to determine whether the addition of the "filler" digit to each denomination of the sum of the two numbers causes a carry out of the denomination. It may therefore consist of a simplified form of the adding unit already described, employing the group of six rectifiers which determine whether two or more pulses are present simultaneously on the three input lines, although a complete adding unit may be used if desired.

Figure 5:
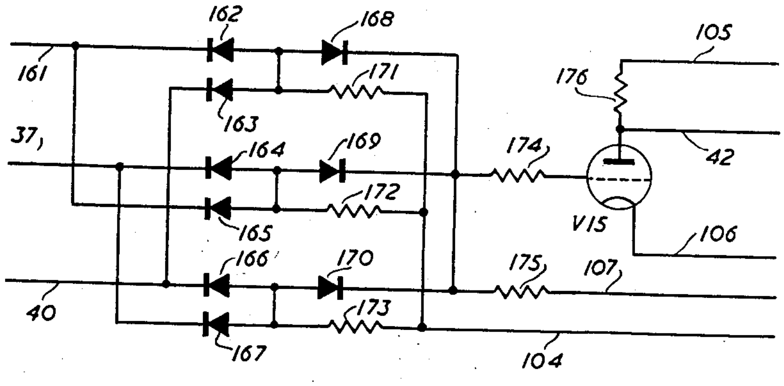
FIGURE 5 is a circuit diagram of a carry generator unit.

Three input lines 37, 40 and 161 (FIGURE 5) carry the pulse trains representing the sum of the two numbers, the "filler" digit and the carry from the carry generator respectively. These lines are connected to six rectifiers 162 to 167 grouped in three pairs and corresponding to rectifiers 62 to 67 (FIGURE 3). The commoned anodes of each pair of rectifiers 162 to 167 are connected through resistors 171 to 173, corresponding to resistors 74 to 76 (FIGURE 3), to the line 104. The same points are also connected to the anodes of three rectifiers 168 to 170, corresponding to rectifiers 79 to 81 (FIGURE 3), the cathodes of which are commoned. This common cathode lead is connected to the grid of a triode V15 by a resistor 174 and to line 107 by a resistor 175. The anode of V15 is connected to an output line 42 (FIGURES 2 and 5) and by resistor 176 to the H.T. line 105. The cathode of V15 is connected to line 106.

From the description of the operation of the adding unit, it will be understood that whenever two or more pulses appear simultaneously on the input lines 37, 40 and 161, a negative pulse will be produced on the output line 42 connected to the anode of V15.

Line 42 is connected to the input of a carry delay unit generally similar to that already described. To provide the output, on line 44 (FIGURE 2), a cathode follower stage similar to V8 has the grid connected, through a condenser, in parallel with the grid of V8 and line 44 is connected to the cathode.

*Delay Unit*

The delay units 12 (FIGURE 1) and 38 (FIGURE 2) may be of any known form which conveniently provides the required delay of four pulse periods. For example, if the storage devices for holding the two numbers comprise ultrasonic delay lines, then a similar type of line of suitable dimensions may be used for the delay unit. Alternatively, it may be desirable to use a so-called "artificial" delay line employing a series of inductance-capacitance sections which are designed so that they approximate in effect to a distributed constant transmission line.

*Pulse Generation*

Throughout the description, reference has been made to a number of controlling pulse trains, such as the shaping waveform. These pulses must be synchronous with those used in other parts of the computing machine, such as those used for reading the numbers out of the storage unit. Accordingly, it is most convenient that they be provided from a master pulse generator which supplies pulse trains to the rest of the machine. The particular pulse trains required may be produced from the master pulses by any known method convenient to the particular machine in which the adding device is employed.

*Adding in Other Notations*

For many purposes, the use of decimal or duodecimal notations will be most convenient. If, however, the data consisted of whole numbers of pounds and pence, for example, calculations might be facilitated by using a notation with radix 240. The method of addition already described may be adapted readily to this radix by employing a pulse group having eight possible positions. The maximum value which may be recorded by such a group is 255, so that the requisite "filler" digit is the difference between this value increased by one and the radix of notation, that is, the "filler" digit is 16.

The relative delay between addition in the first and third adding units must be increased from four to eight units and carry from group to group will also occur at eight unit intervals. By employing pulse trains suitable for these conditions, the circuits will operate in a similar manner to that already described to add two numbers expressed in radix 240.

In the same manner, by employing a ten pulse group and a "filler" digit of 24, it is possible to employ the circuit for adding numbers expressed in a notation with radix 1000.

Since the whole operation of adding is carried out denomination by denomination and the various functions of "filling," carry suppression, etc., are effected by control waveforms, it is possible to deal with composite numbers expressed in more than one notation. For example, one or more denominations of a number may be duodecimal and the remainder decimal. Provided that the arrangement of the denominational notations remains fixed, the control waveforms may be made composite in the same way, so that the correct "filler" digits etc. are provided for each denomination.

What we claim is:

1. An electronic adding device for adding together two numbers each represented by a serial train of pulses in coded group form, the successive pulse positions of each group representing the values of successive terms of a binary series, said adding device comprising three separate serial pulse adding units, the first and third adding units having three inputs, a sum output and a carry output, no input pulse producing no output pulse, one input pulse producing one pulse at said sum output, two input pulses producing one pulse at said carry output, and three input pulses producing a pulse at both said sum output and said carry output, and the second adding unit comprising a carry generator having three inputs and one output, two or more simultaneous input pulses producing a pulse at said single output, a carry delay unit for each said first and third adding units providing a delay of one pulse period and connected between said carry output and a first input; a further carry delay unit providing a delay of one pulse period connected between said single output of said carry generator and a first input of said carry generator; means for applying two serial pulse trains representing said two numbers to the second and third inputs of the first adding unit to form at said sum output of said first adding unit a first serial sum pulse train; means for applying to the second and third said inputs of said carry generator said first serial sum pulse train and a serial pulse train representing in each group a "filler" digit, equal to the difference between the radix of notation of the two numbers and the sum of all the binary values which may be represented in a single pulse group increased by one, to form at the single output of said carry generator a carry pulse train; means for applying to a second said input of said third adding unit said first sum pulse train; means controlled by the carry pulses at the carry output of said first adding unit and at the single output of said carry generator for applying to the third said input of said third adding unit a filler digit pulse group for each pulse group of said first sum pulse train which produced a carry out of the group during the additions in the first adding unit or said carry generator; and means for providing a relative time delay equal to the duration of one pulse group between the additions effected in said second and third adding means.

2. An electronic adding device for adding two numbers each of which is represented by a serial train of pulses consisting of denominational groups, the successive pulse positions of a group representing successive binary values, said adding device comprising a first binary adder for adding the two number-representing pulse trains to form a first sum pulse train; means for generating a filler digit pulse train consisting of coded groups, each of which represents a filler digit equal to the difference between the radix of notation of a denomination of the two numbers and the sum increased by one of all the binary values which may be represented in that denominational group; a second binary adder for adding said first sum pulse train and said filler digit pulse train; a bistable device; means responsive to the occurrence of a carry from one pulse group to the succeeding pulse group in the first adder or in the second adder to generate a pulse to set the bistable device to a first state; means for setting the bistable device to the second state after each pulse group; a gate controlled by the bistable device and by the filler digit pulse train and operative to pass filler digit pulse groups when the bistable device is in the first state; means for delaying the first sum pulse train by a period equal to the duration of one pulse group; and a third binary adder for adding the delayed first sum pulse train and the filler digit pulse groups passed by said gate to form a corrected sum pulse train.

3. Apparatus for adding to multi-digit numbers represented by binary coded serial pulse trains, comprising first and second binary adders, each having two inputs for numbers to be added and a sum output; means for applying said two binary coded pulse trains to the two inputs of the first adder; digit delay means interconnecting the sum output of the first adder and one input of the second adder; a filler digit pulse train source; each filler digit being equal to the difference between the radix of a denomination of the two numbers and the sum increased by one of all the binary values which may be represented in that denominational group; signal-gating means interconnecting the filler digit source and the other input of the second binary adder; and signal-responsive means connected to the sum output of the first adder, to the filler digit source and to a carry output from the first adder and operative to control the gating means to feed the filler digit pulse train selectively to the second adder.

4. Apparatus for adding two multi-digit numbers represented by serial binary coded digit pulse groups, comprising a first binary adder having two inputs for numbers to be added and sum and carry outputs; means for applying the pulse groups representing the numbers to the two inputs of the first adder; a second binary adder having two inputs for numbers to be added; a signal delay device connecting the sum output of the first adder to one input of the second adder, the delay device providing a time delay equal to the duration of a digit pulse group; a source of filler digit pulse groups; each of which is equal to the difference between the radix of a denomination and the sum increased by one of all the binary values which may be represented in that group; signal-gating means connected between the filler digit source and the other input of the second binary adder; carry signal-generating means connected to the sum output of the first adder and to the source of filler digit pulse groups; and means controlled jointly by signals from the carry output of the first adder and the carry signal-generating means and operative to control said signal-gating means.

References Cited in the file of this patent

UNITED STATES PATENTS 2,898,042 Wormersley et al. -------- Aug. 4, 1959